(12) United States Patent
Banerjee et al.

(10) Patent No.: US 7,248,589 B2
(45) Date of Patent: Jul. 24, 2007

(54) APPARATUS FOR ENABLING MULTI-TUPLE TCP SOCKETS WITHIN A COMPUTER NETWORK

(75) Inventors: Dwip N. Banerjee, Austin, TX (US); Lilian Sylvia Fernandes, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 10/455,160

(22) Filed: Jun. 5, 2003

(65) Prior Publication Data

US 2004/0246971 A1    Dec. 9, 2004

(51) Int. Cl.
*H04L 12/28* (2006.01)
(52) U.S. Cl. ............. 370/395.32; 709/239; 370/395.51
(58) Field of Classification Search ............... None
See application file for complete search history.

(56) References Cited

U.S. PATENT DOCUMENTS 6,993,584 B2 * 1/2006 Border et al. ............... 709/227

* cited by examiner

*Primary Examiner*—Rafael Perez-Gutierrez
*Assistant Examiner*—Suk Jin Kang
(74) *Attorney, Agent, or Firm*—Diana R. Gerhardt; Dillon & Yudell LLP

(57) ABSTRACT

A method for enabling multi-tuple TCP sockets within a computer network is disclosed. All possible connection paths between a first computer and a second computer are initially determined. Then, tuple information of all the possible connection paths are stored in a respective socket of the first and second computers as multi-tuple information. Next, one of the possible connection paths is designated as a preferred path and the remaining possible connection paths are designated as alternate paths. Finally, data packets are transmitted via the preferred path after a TCP connection has been established between the first and second computers on the preferred path.

6 Claims, 3 Drawing Sheets

APPARATUS FOR ENABLING MULTI-TUPLE TCP SOCKETS WITHIN A COMPUTER NETWORK

BACKGROUND OF THE INVENTION

1. Technical Field

The present invention relates to computer networks in general, and in particular, to computer networks having a Transmission Control Protocol (TCP) connection. Still more particularly, the present invention relates to an apparatus for enabling multi-tuple TCP sockets within a computer network

2. Description of the Related Art

Any delivery of data between two computer systems has to meet the rules of the five-layer Open Systems Interconnection (OSI) model. Layer 5 (the topmost layer) is the Application layer that represents such protocols as File Transfer Protocol (FTP), Simple Mail Transfer Protocol (SMTP), Telnet, etc. Layers 4 and 3 are the Transmission Control Protocol (TCP) layer and the Internet Protocol (IP) layer, respectively, which are used by computer systems attached to the Internet and other private networks. Layer 2 is the Data Link Protocol layer, which includes Ethernet, Fiber Distributed Data Network (FDDI), Frame Relay (FR), Asynchronous Transfer Mode (ATM), etc. Some of the layer 2 protocols transgress into other protocol layers, above and below, as dictated by the nature of transmission rules of the protocol. Layer 1 is the Physical layer that is represented by the physical medium of transmission such as the single-mode or multi-mode fibers used for ATM, twisted copper pairs used in local-area networks (LANs), radio channels for wide-area networks (WANs), and related hardware.

In general, where LAN-to-LAN communications are carried out by using TCP via a WAN, a mutual connection system commonly known as a router, which can handle the processes up to the network layer, is employed to connect a LAN to the WAN. In the mutual connection system, the protocol processes in the physical layer to the network layer in the OSI reference model have been accomplished, and flow control and error control are carried out between the terminals by using TCP on an end-to-end basis.

Currently, when a TCP connection is initiated between two computer systems within a computer network, a path selected to the destination is usually cached in a socket. Also, a 4-tuple, which includes a source IP address, a destination IP address, a source port, and a destination port, is constructed and stored in the socket. In the above-mentioned scenario, the TCP connection will fail if any router along the selected path goes down. In addition, the TCP connection may suffer from poor performance if any router along the selected path is congested with too much network traffic. As a result, those routers may drop IP packets, which causes the TCP connection to retransmit packets such that performance is diminished.

Consequently, it would be desirable to furnish an improved method and apparatus for providing a TCP connection within a computer network.

SUMMARY OF THE INVENTION

In accordance with a preferred embodiment of the present invention, all possible connection paths between a first computer and a second computer are determined. Then, tuple information of all the possible connection paths are stored in a respective socket of the first and second computers as multi-tuple information. Next, one of the possible connection paths is designated as a preferred path and the remaining possible connection paths are designated as alternate paths. Finally, data packets are transmitted via the preferred path after a TCP connection has been established between the first and second computers on the preferred path.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention provides an enhancement to a Transmission Control Protocol (TCP) connection in the form of a socket option, such as a TCP_MULTIPATH. A user may set such a socket option before actually initiating a TCP connection. Once the socket option is set, the following actions are carried out by the operating system after the TCP connection has been initiated. First, a host attempts to find all possible paths between the host and a destination. For example, a host may have two different paths to a destination, one path going through its Ethernet interface (with an IP address $IP_A$) and the other path through its token ring interface (with an IP address $IP_B$). Both of the paths are cached in a socket.

Second, one path is designated as the preferred path and the remaining paths are designated as alternate paths. When the TCP connection needs to retransmit packets, the TCP connection sends all retransmissions on the alternate paths. If an alternate path is determined to have a better performance over the preferred path, the alternate path is switched to become the preferred path and vice versa.

Third, the socket is changed from a single tuple to a multi-tuple socket. The number of tuple depends on the number of paths. In the present example, since there are two paths, the single 4-tuple of {source IP address, destination IP address, source port, destination port} is changed to a list of two 4-tuples, as follows:

{source IP address $IP_A$, destination IP address, source port, destination port}

{source IP address $IP_B$, destination IP address, source port, destination port}

The socket is then marked with a multi-tuple flag. In the prior art, when the operating system tries to deliver incoming packets, the operating system normally compares the 4-tuple values in the packet with the 4-tuple on all sockets within a computer system. For multi-tuple sockets of the present invention, the operating system has to compare the 4-tuple values in a packet with each 4-tuple in the list of 4-tuples within the socket.

When a host initiates a TCP connection, the host also negotiates with a destination to make sure that the destination also supports multi-tuple sockets. If the destination also supports multi-tuple sockets, then the list of 4-tuples must be exchanged and stored in the sockets at both the host and the destination before a TCP connection can proceed.

Figure 1:
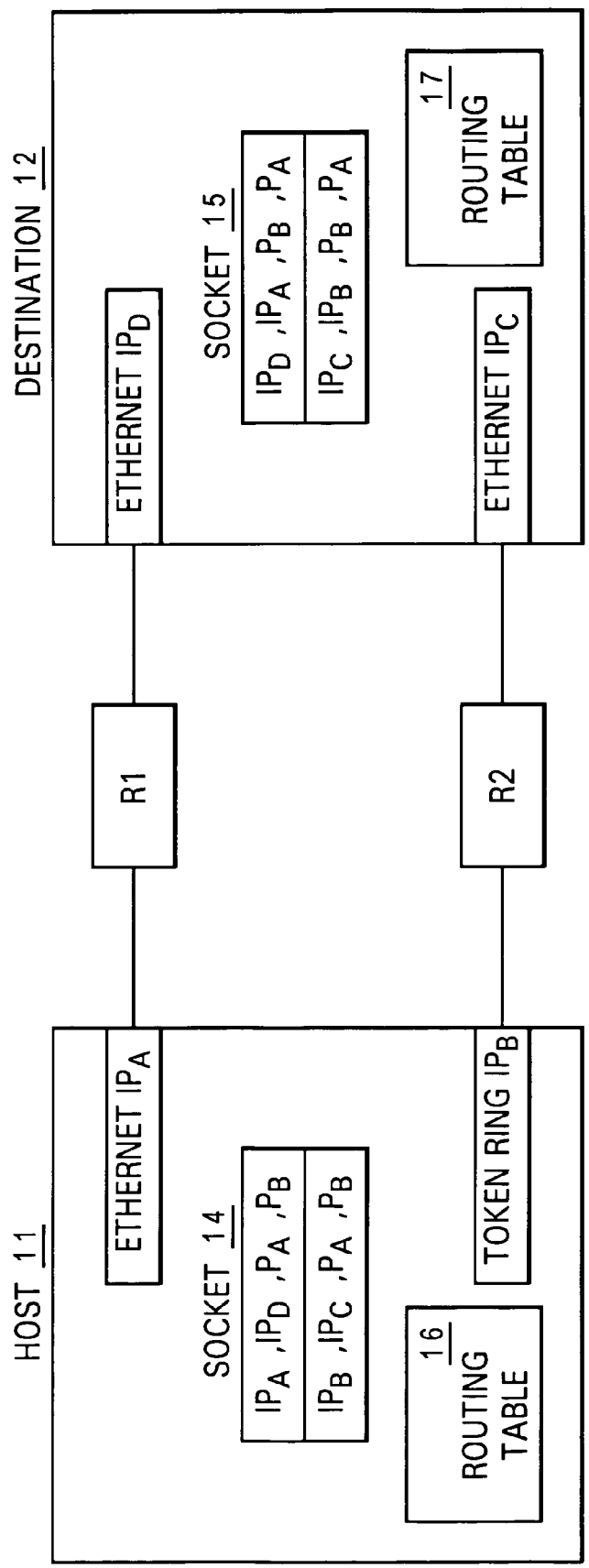
FIG. 1 is a block diagram of a computer network, in accordance with a preferred embodiment of the present invention.

Referring now to the drawings and in particular to FIG. 1, there is depicted a block diagram of a computer network, in accordance with a preferred embodiment of the present invention. As shown, a computer network 10 includes a host 11 and a destination 12 connected to each other via two separate paths. In the present example, the first path is between an Ethernet port $IP_A$ of host 11 and an Ethernet port $IP_D$ of destination 12 via a router R1. Similarly, the second path is between a token ring port $IP_B$ of host 11 and an Ethernet port $IP_C$ of destination 12 via a router R2.

Host 11 includes a multi-tuple socket 14 for storing 4-tuple information of the all possible paths between host 11 and destination 12. In the present example, multi-tuple socket 14 includes the above-mentioned two paths as follows:

path 1: {source IP address $IP_A$, destination IP address $IP_D$, source port $P_A$, destination port $P_B$} path 2: {source IP address $IP_B$, destination IP address $IP_C$, source port $P_A$, destination port $P_B$}

Similarly, destination 12 also includes a multi-tuple socket 15 for storing 4-tuple information of the all possible paths between host 11 and destination 12. In the present example, multi-tuple socket 15 includes the above-mentioned two paths as follows:

path 1: {source IP address $IP_D$, destination IP address $IP_A$, source port $P_B$, destination port $P_A$} path 2: {source IP address $IP_C$, destination IP address $IP_B$, source port $P_B$, destination port $P_A$}

Any one of paths 1 and 2 can be designated as the preferred path while the other path is designated as the alternate path. In addition, host 11 and destination 12 include routing tables 16 and 17, respectively. The usages of routing tables 16, 17 are well-known to those skilled in the relevant art.

Figure 2:
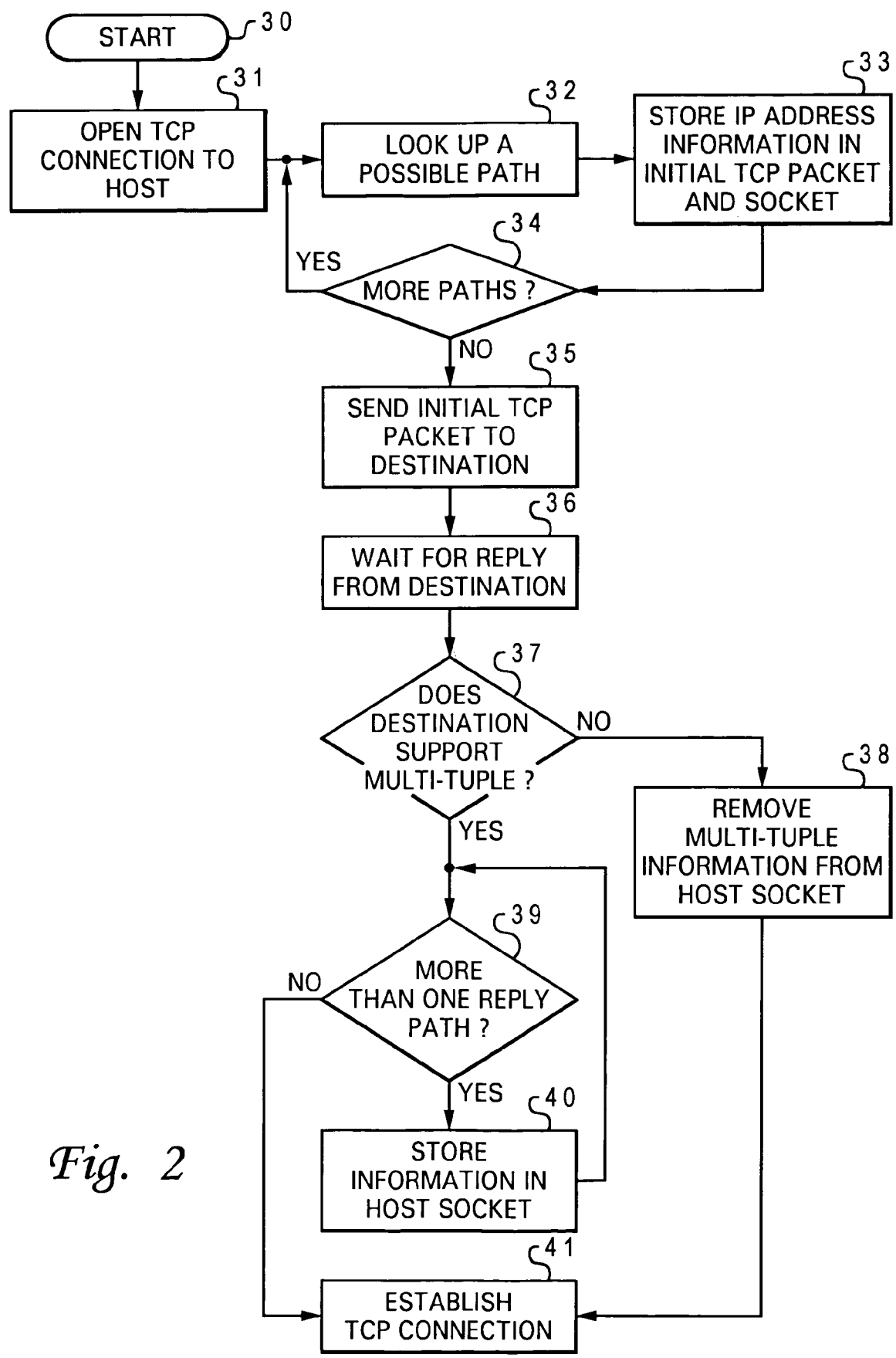
FIG. 2 is a high-level logic flow diagram of a method for setting up a connection between two computer systems within the computer network from FIG. 1, in accordance with a preferred embodiment of the present invention.

With reference now to FIG. 2, there is depicted a high-level logic flow diagram of a method for setting up a TCP connection between two computer systems, such as host 11 and destination 12 from FIG. 1, in accordance with a preferred embodiment of the present invention. Starting at block 30, a TCP connection is opened to host 11, as shown in block 31. A possible path between host 11 and destination 12 is located, as depicted in block 32. The IP address information from the path is stored in an initial TCP packet and socket, as shown in block 33. A determination is then made as to whether or not there is another path between host 11 and destination 12, as depicted in block 34. If there is another path between host 11 and destination 12, then the process returns back to block 32, Otherwise, if there is no more path between host 11 and destination 12, the initial TCP packet is sent to destination 12, as shown in block 35. Host 11 then waits for a reply from destination 12, as depicted in block 36. Upon the receipt of the reply from destination 12, a determination is then made as to whether or not destination 12 supports a multi-tuple socket, as shown in block 37. If destination 12 does not support a multi-tuple socket, any multi-tuple information is removed from the socket of host 11, as depicted in block 38. Otherwise, if destination 12 supports a multi-tuple socket, then another determination is made as to whether or not there is more than one reply path between host 11 and destination 12, as shown in block 39. If there is more than one reply path between host 11 and destination 12, such information is stored in the socket of host 11, as depicted in block 40. Otherwise, if there is only one reply path between host 11 and destination 12, a TCP connection is established under the multi-tuple socket, as shown in block 41.

Figure 3:
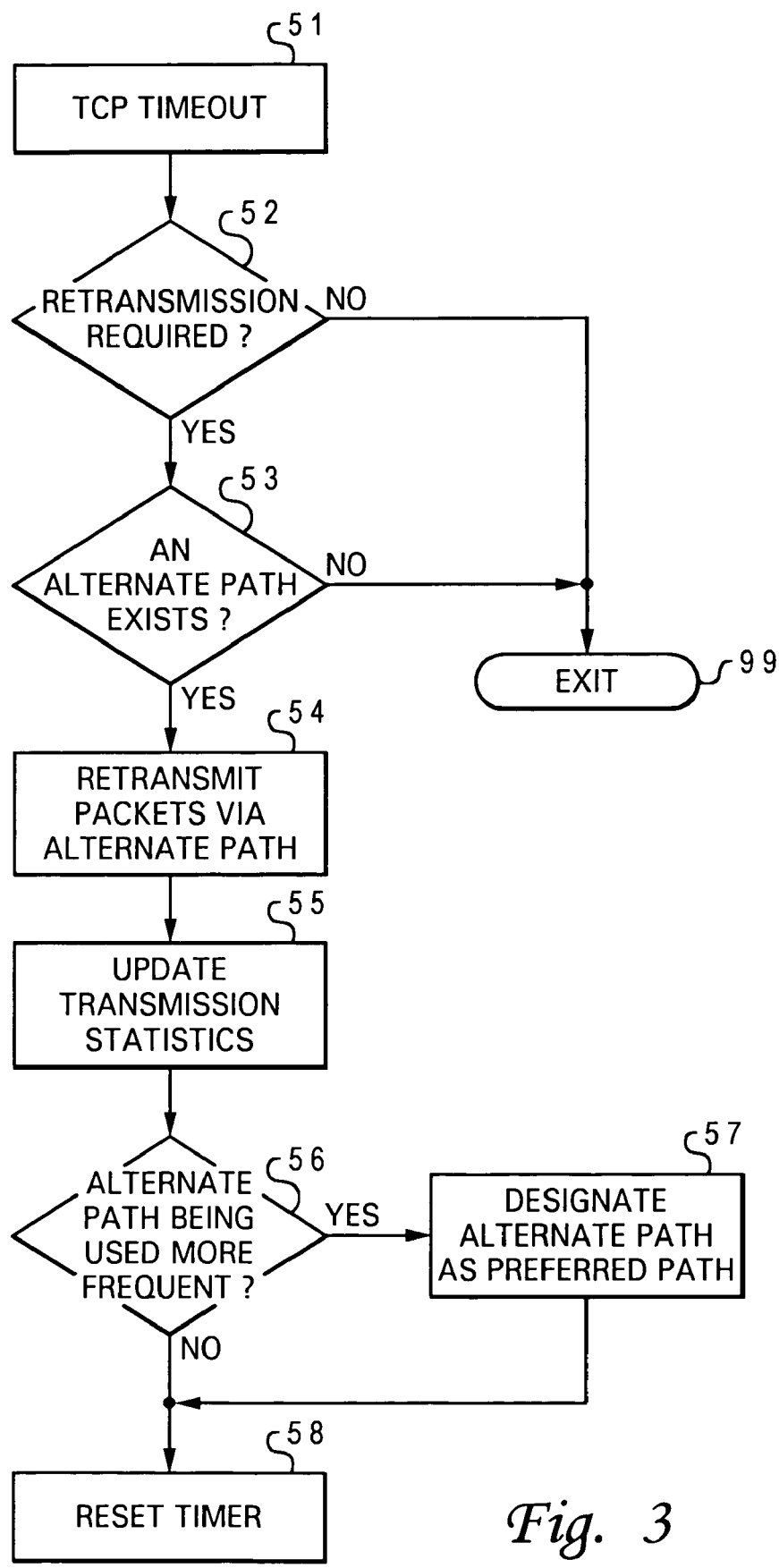
FIG. 3 is a high-level logic flow diagram of a method for sending data packets between two computer systems within the computer network from FIG. 1, in accordance with the preferred embodiment of the present invention.

Referring now to FIG. 3, there is depicted a high-level logic flow diagram of a method for sending data packets between two computer systems, such as host 11 and destination 12 from FIG. 1, in accordance with the preferred embodiment of the present invention. In response to a TCP connection timeout, as shown in block 51, a determination is made as to whether or not a data packet needs to be retransmitted, as depicted in block 52. If the data packet does not need to be retransmitted, the process exits at block 99. If the data packet needs to be retransmitted, then another determination is then made as to whether or not there is an alternate path between host 11 and destination 12, as shown in block 53. If there is no alternate path between host 11 and destination 12, the process exits at block 99. If there is an alternate path between host 11 and destination 12, the data packet is retransmitted via the alternate path, as shown in block 54. The transmissions statistics for the alternate path is then updated, as depicted in block 55.

A determination is then made as to whether or not the transmissions statistics indicates that a large number of retransmissions has occurred at the alternative path over a period of time, as shown in block 56. If the transmissions statistics indicates that a large number of retransmissions has occurred at the alternative path over a period of time, the alternate path is then designated as the preferred route, as depicted in block 57. Otherwise, the TCP connection timer is reset, as shown in block 58.

As has been described, the present invention provides an improved method and apparatus for enabling multi-tuple TCP sockets in order to establish a TCP connection between two computer systems within a computer network. Under the present invention, if a router along the preferred path between the two computer systems fails, the TCP connection may simply continue by switching to one of the alternate paths. Also, if the preferred path becomes congested, the TCP connection can be switched to the alternate path for better performance. Another advantage of the present invention is that the host may avoid using current congestion control mechanisms along with a slow-start by simply using the alternate path instead.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs.

While the invention has been particularly shown and described with reference to a preferred embodiment, it will be understood by those skilled in the art that various changes in form and detail may be made therein without departing from the spirit and scope of the invention.

What is claimed is:

1. A method for providing a Transmission Control Protocol (TCP) connection between a first computer and a second computer within a computer network, said method comprising:
   determining all possible connection paths between said first and second computers;
   storing tuple information of said all possible connection paths in a respective socket of said first and second computers as multi-tuple information;
   designating one of said all possible connection paths as a preferred path and the remaining possible connection paths as alternate paths;
   transmitting data packets via said preferred path after a TCP connection has been established between said first and second computers on said preferred path; and
   in response to a transmission problem encountered by said preferred path, designating one of said alternative paths that has been utilized relatively more frequent as said preferred path, and transmitting data packets via said one of said alternative paths based on said multi-tuple information.

2. The method of claim 1, wherein said multi-tuple information includes a list of four-tuples.

3. A computer usable medium having a computer program product for providing a Transmission Control Protocol (TCP) connection between a first computer and a second computer within a computer network, said computer usable medium comprising:
   computer program code for determining all possible connection paths between said first and second computers;
   computer program code for storing tuple information of said all possible connection paths in a respective socket of said first and second computers as multi-tuple information;
   computer program code for designating one of said all possible connection paths as a preferred path and the remaining possible connection paths as alternate paths;
   computer program code for transmitting data packets via said preferred path after a TCP connection has been established between said first and second computers on said preferred path; and
   computer program code for, in response to a transmission problem encountered by said preferred path, designating one of said alternative paths that has been utilized relatively more frequent as said preferred path, and for transmitting data packets via said one of said alternative paths based on said multi-tuple information.

4. The computer usable medium of claim 3, wherein said multi-tuple information includes a list of four-tuples.

5. An apparatus for providing a Transmission Control Protocol (TCP) connection between a first computer and a second computer within a computer network, said apparatus comprising:
   means for determining all possible connection paths between said first and second computers;
   means for storing tuple information of said all possible connection paths in a respective socket of said first and second computers as multi-tuple information;
   means for designating one of said all possible connection paths as a preferred path and the remaining possible connection paths as alternate paths;
   means for transmitting data packets via said preferred path after a TCP connection has been established between said first and second computers on said preferred path; and
   means for, in response to a transmission problem encountered by said preferred path, designating one of said alternative paths that has been utilized relatively more frequent as said preferred path, and for transmitting data packets via said one of said alternative paths based on said multi-tuple information.

6. The apparatus of claim 5, wherein said multi-tuple information includes a list of four-tuples.

* * * * *